(12) United States Patent
Deng

(10) Patent No.: US 6,239,997 B1
(45) Date of Patent: May 29, 2001

(54) SYSTEM FOR CONNECTING AND SYNCHRONIZING A SUPPLEMENTAL POWER SOURCE TO A POWER GRID

(75) Inventor: Doug D. Deng, Canton, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 09/653,478

(22) Filed: Sep. 1, 2000

(51) Int. Cl.[7] .................................................. H02M 7/44
(52) U.S. Cl. ....................................... 363/95; 363/98
(58) Field of Search .................................. 363/95, 96, 98

(56) References Cited

U.S. PATENT DOCUMENTS

| | | | |
|---|---|---|---|
| 4,367,522 | * 1/1983 | Forstbauer et al. | 363/96 |
| 4,656,413 | 4/1987 | Bourbeau . | |
| 4,665,474 | * 5/1987 | Neupauer | 363/35 |
| 4,766,327 | * 8/1988 | Fox | 363/95 |
| 5,083,039 | 1/1992 | Richardson . | |
| 5,138,248 | * 8/1992 | Tanoue et al. | 363/95 |
| 5,148,361 | * 9/1992 | Braun et al. | 363/98 |
| 5,329,221 | * 7/1994 | Schauder | 363/98 |
| 5,625,539 | * 4/1997 | Nakata et al. | 363/98 |
| 5,798,633 | 8/1998 | Larsen et al. . | |
| 5,892,354 | * 4/1999 | Nagao et al. | 363/95 |
| 5,892,664 | 4/1999 | Vedder . | |
| 6,058,035 | * 5/2000 | Madenokouji et al. | 363/95 |
| 6,111,767 | * 8/2000 | Handleman | 363/98 |

* cited by examiner

*Primary Examiner*—Jeffrey Sterrett
(74) *Attorney, Agent, or Firm*—Karl Vick

(57) ABSTRACT

A system (10) and method (100) for connecting and synchronizing a supplemental power supply (10) and a power grid. The present invention detects current feedback signals $i_a$ and $i_b$ and grid phase voltage input signals $U_{a\_g}$, $U_{b\_g}$, and $U_{c\_g}$ for controlling and synchronizing the three-phase output voltages $U_{a\_p}$, $U_{b\_p}$, and $U_{c\_p}$, of the supplemental power supply (10) with the power grid. The method (100) of the present invention detects the three-phase voltages of both the supplemental power supply, $U_{a\_p}$, $U_{b\_p}$, $U_{c\_p}$ and the power grid $U_{a\_g}$, $U_{b\_g}$, $U_{c\_g}$, and converts the detected voltages into components $U_{d\_com}$, $U_{q\_com}$ on a d-q plane.

17 Claims, 4 Drawing Sheets ting SYSTEM FOR CONNECTING AND SYNCHRONIZING A SUPPLEMENTAL POWER SOURCE TO A POWER GRID

TECHNICAL FIELD the present invention relates generally to a supplemental power source, and more particularly to a system and method for connecting and synchronizing a supplemental power source to a power grid.

BACKGROUND OF THE INVENTION

When a supplemental power source, such as a three-phase generator, is connected to a power grid, a small difference in the frequency, phase angle, or magnitude between the source and the grid can create very large over current. This is because the voltage source usually has very low impedance. The over current condition can trigger the power grid to "shut-down" or may damage circuit components.

Therefore, it is necessary when connecting a supplemental power source to a power grid to guarantee that the three phase output voltage of the power source has the same phase sequence, the same phase angle, and the same magnitude and frequency as the three phase voltage of the power grid. This is called synchronization of the power source and the power grid.

In the prior art, it is known to employ a phase lock loop technique to control the phase synchronization of the supplemental power source (SPS) and the power grid. Prior to the present application, this technology is basically a hard-wired configuration requiring hardware and associated hardware control technology. This technique requires separate phase and magnitude detecting circuits to control the voltage phase and magnitude of the supplemental power source. Extra circuitry is required to calculate the frequency of the supplemental power source or the power grid.

SUMMARY OF THE INVENTION

It is an object of the present invention to connect a supplemental power source to a power grid. It is another object of the present invention to synchronize the connection of a supplemental power source to a power grid.

It is a further object of the present invention to provide a software solution for connecting a supplemental power source to a power grid. It is still a further object of the present invention to detect the three phase voltages of the power grid, and to control the SPS voltage magnitude and phase to generate a more flexible method of connection.

In carrying out the above objects and other objects and features of the present invention, a software solution is provided for connecting a supplemental power supply to a power grid. The system and method of the present invention uses fewer devices and generates more useful information, i.e. phase sequence, phase angle, grid frequency, etc., for control while providing a faster response and increased flexibility for control.

The present invention is an electronic supplemental power supply having circuitry and controls for detecting grid voltage and current that are used to synchronize, and connect, the three-phase output voltages of the supplemental power supply with a power grid. Through these controls, the method of the present invention detects the three phase voltages of both the supplemental power supply and the power grid and converts the detected voltages into components on a d-q plane.

The converted values are controlled and transformed to eliminate output voltage errors and correct the actual three-phase output voltages from the supplemental power source so that they are as close as possible to the voltages of the power grid.

According to the method of the present invention, current regulators are used to eliminate the possibility of over current caused by voltage errors between the supplemental power source and the power grid.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
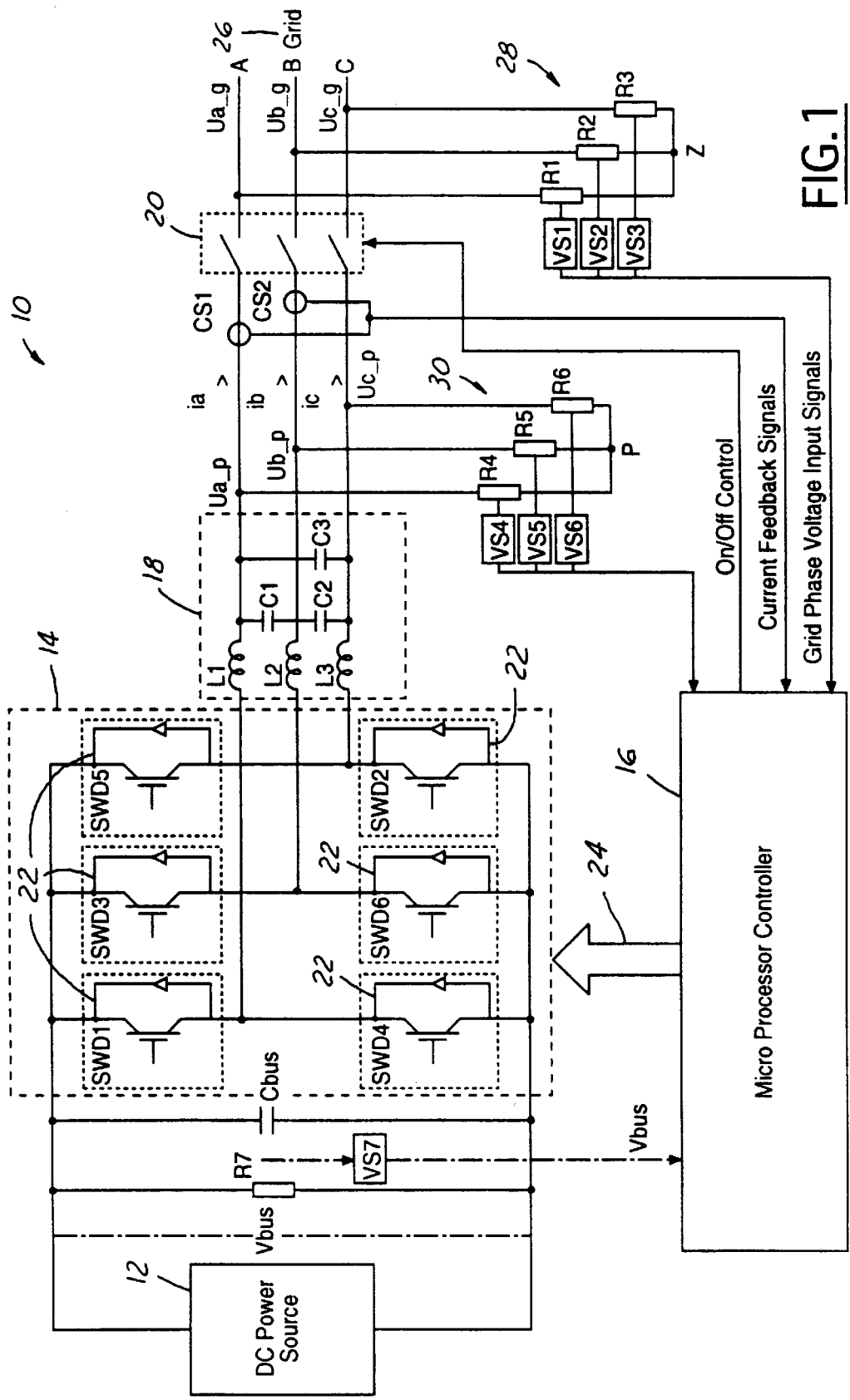
FIG. 1 is a circuit diagram of an electronic supplemental power supply as it is connected to a power grid according to the present invention.

FIG. 1 is a schematic of a circuit used in conjunction with the control method of the present invention. There is shown in FIG. 1 a supplemental power supply 10 having a DC power source 12, an electronic inverter 14, a microprocessor based controller 16 for controlling the inverter 14, a three-phase AC line filter 18 and a three-phase circuit contactor 20.

The DC power source 12 is the energy source for the supplemental power supply 10. It can be any one of several DC power sources. For example, a battery, an engine driven DC generator, an engine driven AC generator with a rectifier, fuel cells, a solar converter, etc. The inverter 14 converts the DC input power to a three-phase AC output power. The inverter 14 shown in the present example consists of six (6) semi-conductor switching devices 22. The mirco-processor controller 16 provides pulse gating signals 24 to the inverter 14. Through a pulse-width modulation technique, the microprocessor controller 16 controls the output line-to-line voltages of the inverter 14 to a desired magnitude and frequency, i.e. 208V/60 Hz or 480V/60 Hz. The AC line filter 18 eliminates the harmonic components present in the output voltages and currents that are caused by the switching operation in the inverter 14. The contactor 20 connects and disconnects the supplemental power supply 10 to a power grid 26.

Figure 2:
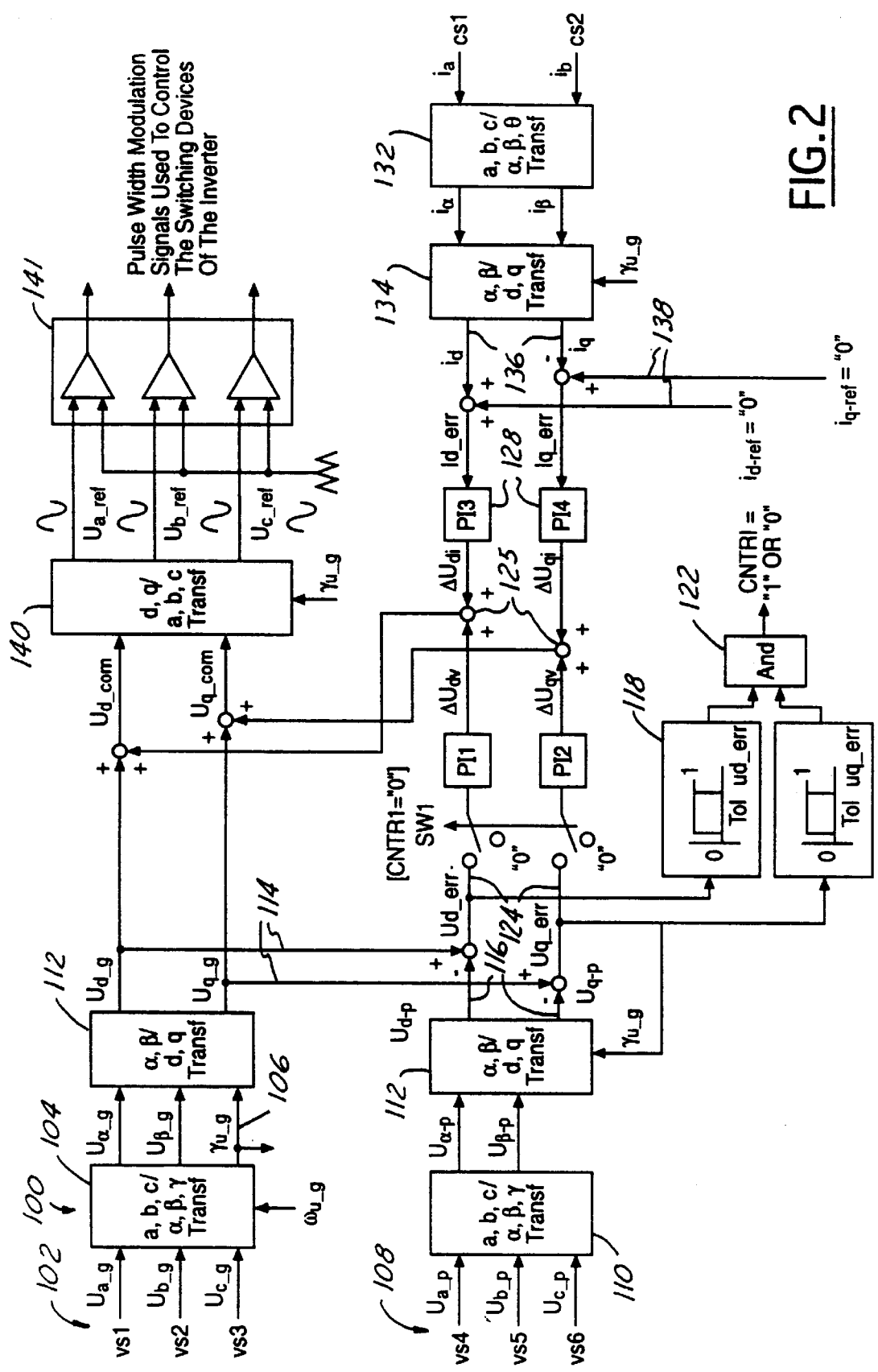
FIG. 2 is a block diagram of the control method for synchronizing the three-phase output voltages of the supplemental power supply and the power grid.

The method 100 of the present invention is shown in the block diagram of FIG. 2. According to the method 100 of the present invention, the supplemental power supply is connected to the power grid through software control.

The three-phase voltages $U_{a\_g}$, $U_{b\_g}$, and $U_{c\_g}$ are detected 102 by the y-connected resistor network 28 containing R1, R2 and R3 (shown in FIG. 1 only) and the voltages are sensed by voltage sensors VS1, VS2, and VS3 (shown in FIGS. 1 and 2). In another embodiment shown in FIG. 5, the three-phase voltages $U_{a\_g}$, $U_{b\_g}$, and $U_{c\_g}$ are detected 102 by a y-connected transformer 228 containing windings T1, T2 and T3. The detected voltages, $U_{a\_g}$, $U_{b\_g}$, and $U_{c\_g}$ are then converted 104 to a rotating vector on an α-β plane, $U_{\alpha\_g}$, $U_{\beta\_g}$ according to the following algorithms:

$$U_{\beta\_g}=(2/3)U_{a\_g}-(1/3)(U_{b\_g}+U_{c\_g}) \quad (1)$$

$$U_{\beta\_g}=(\sqrt{3}/3)*(U_{b\_g}-U_{c\_g}) \quad (2)$$

Figure 3:
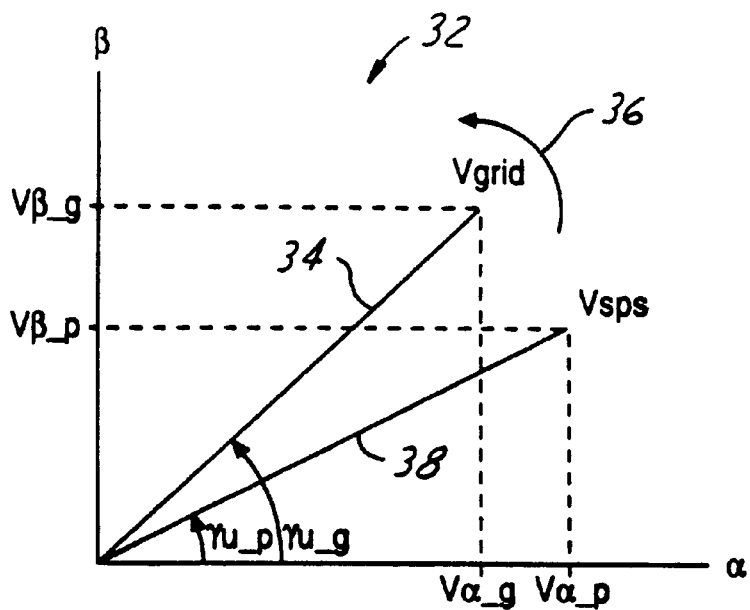
FIG. 3 is a vector diagram of the rotating vector showing the grid vector voltages and the supplemental power source vector voltage on the two-phase, stationary $\alpha$-$\beta$ plane.

According to algorithms (1) and (2), the three phase grid voltages, $U_{a\_g}$, $U_{b\_g}$ and $U_{c\_g}$, are converted to be a rotating grid voltage vector with two components, $U_{\alpha\_g}$ and $U_{\beta\_g}$, on a two axis plane, α-β plane. FIG. 3 is a graph 32 depicting the grid voltage vector 34 on the two-axis α-β plane.

Referring again to FIG. 2, the rotating angle, $\gamma_{u\_g}$, of the grid voltage vector on the α-β plane is obtained 106 from the following algorithm:

$$\gamma_{u\_g}=\arctan(U_{\beta\_g}/U_{60\_g}) \quad (3)$$

The rotating direction 36 of the grid voltage vector 34 is shown in FIG. 3. The rotating angle is an important control variable for the control method, and will be discussed in detail herein. The angle frequency, $\omega_{u\_g}$ of the grid voltage vector can be obtained by calculating the change in the rotating phase angle, $\gamma_{u\_g}$ versus time. The grid voltage frequency $\omega_{u\_g}$ can be obtained by the following equation:

$$\omega_{u\_g}=(\gamma_{u\_g}[k]-\gamma_{u\_g}[k-1])/\Delta t_k \quad (4)$$

where $\Delta t_k$ is the time interval between the two angles, $\gamma_{u\_g}[k]$ and $\gamma_{u\_g}[k-1]$ at the time step k and time step k−1. The phase sequence of the grid voltage is known from the sign of the calculated grid frequency, $\omega_{u\_g}$. A "+" sign indicates a positive sequence and a "−" sign indicates a negative sequence. The magnitude of the grid voltage vector is calculated from the voltage components $U_{\alpha\_g}$ and $U_{\beta\_g}$.

Referring again to FIG. 2, the three-phase supplemental power supply output voltages, $U_{a\_p}$, $U_{b\_p}$, and $U_{c\_p}$, are detected 108 by the y-connected resistor network 30 containing R4, R5 and R6 (shown in FIG. 1 only) and the voltages are sensed by voltage sensors VS4, VS5, and VS6 (shown in FIGS. 1 and 2). In the embodiment shown in FIG. 5, the three-phase supplemental power supply output voltages, $U_{a\_p}$, $U_{b\_p}$, and $U_{c\_p}$ are detected 108 by a y-connected transformer 230 containing windings T4, T5, and T6. The detected voltages, $U_{a\_p}$, $U_{b\_p}$, and $U_{c\_p}$, are converted 110 to a rotating voltage vector on the α-β plane according to the following algorithms:

$$U_{\alpha\_p}=(2/3)U_{a\_p}-(1/3)(U_{b\_p}+U_{c\_p}) \quad (5)$$

$$U_{\beta\_p}=(\sqrt{3}/3)*(U_{b\_p}-U_{c\_p}) \quad (6)$$

FIG. 3 depicts the supplemental power supply voltage vector 38.

Referring back to FIG. 2, the rotating vectors for the grid and the supplemental power supply are then converted 112 into voltages on the d-q plane. The algorithms used to convert the rotating vectors into voltages on the d-q plane include the rotating angle, $\gamma_{u\_g}$, in order to guarantee the d-q plane has synchronized rotating speed with the grid voltage vector. The algorithms for the conversions 112 are as follows:

$$U_{d\_g}=U_{\alpha\_g}\cos\gamma_{u\_g}-U_{\beta\_g}\sin\gamma_{u\_g} \quad (7)$$

$$U_{q\_g}=U_{\alpha\_g}\sin\gamma_{u\_g}+U_{\beta\_g}\cos\gamma_{u\_g} \quad (8)$$

$$U_{d\_p}=U_{\alpha\_p}\cos\gamma_{u\_g}-U_{\beta\_p}\sin\gamma_{u\_g} \quad (9)$$

$$U_{q\_p}=U_{\alpha\_p}\sin\gamma_{u\_g}+U_{\beta\_p}\cos\gamma_{u\_g} \quad (10)$$

Figure 4:
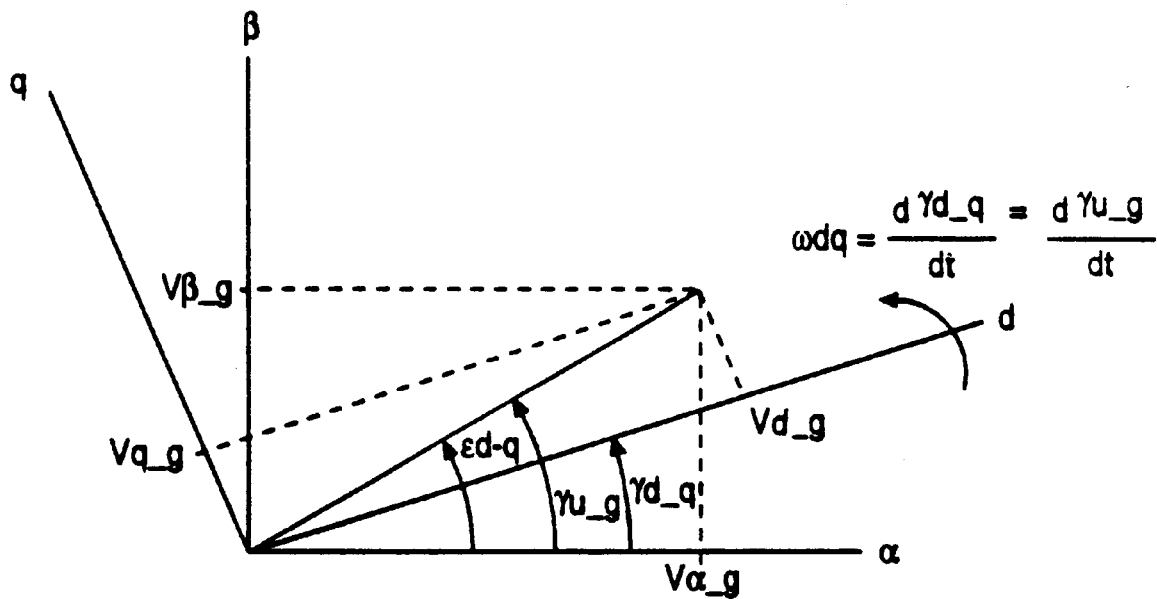
FIG. 4 is a vector diagram of the grid voltage vector on the $\alpha$-$\beta$ plane and on the d-q plane.

FIG. 4 depicts the grid voltage vector 36 on the α-β plane and the d-q plane.

The grid voltages in the d-q plane, $U_{d\_g}$ and $U_{q\_g}$ are supplied 114 as reference voltages to two proportional-integral regulators, PI1 and PI2. The supplemental power supply voltages, $U_{d\_p}$ and $U_{q\_p}$, in the d-q plane are supplied 116 as feedback to the voltage regulators PI1 and PI2. Because the two reference voltages, $U_{d\_g}$ and $U_{q\_g}$, are detected three-phase grid voltages, and the feedback voltages, $U_{d\_p}$ and $U_{q\_p}$, are the inverter output voltages, the output three-phase voltages from the inverter can be controlled to follow the grid three-phase voltages in phase angle and magnitude by the two voltage regulators PI1 and PI2. The reference voltages and the feedback voltages are used to determine error signals, $U_{d\_err}$ and $U_{q\_err}$. $U_{d\_err}$ is the difference between the reference voltage $U_{d\_g}$ and the feedback voltage $U_{d\_p}$. $U_{q\_err}$ is the difference between the reference voltage $U_{q\_g}$ and the feedback voltage $U_{q\_p}$.

An algorithm is used to determine the synchronization of the supplemental power supply output voltage and the grid output voltage. The algorithm determines when $U_{d\_err}$ and $U_{q\_err}$ reach a predetermined tolerance, thereby indicating when synchronization is realized 118 and 120. The output status of the error algorithms will change from zero to one when the error signals are within the predetermined tolerance. The output of the error signals undergoes a logical AND operation 122 to determine the contactor closing signal, either one or zero. A signal of one will close the contactor. A signal of one is reached when both error signals are within the predetermined tolerance value. When the contactor is closed, zero signals are supplied 124 as inputs to the PI regulators PI1 and PI2.

The voltages $\Delta U_{dv}$ and $\Delta U_{qv}$ are the output of PI1 and PI2 and are summed 126 with the d-q axis grid voltages $U_{d\_g}$ and $U_{q\_g}$ to obtain $U_{d\_com}$ and $U_{q\_com}$. The PI regulator outputs are used to compensate the d-q grid voltage reference to eliminate any voltage errors in the inverter output. Therefore, it is possible to control the output voltages from the supplemental power source, $U_{a\_p}$, $U_{b\_p}$, and $U_{c\_p}$, as closely as possible to the output voltages from the grid, $U_{a\_g}$, $U_{b\_g}$, and $U_{c\_g}$, in both magnitude and phase angle. The voltage regulators are used to correct the actual three-phase output voltages from the supplemental power supply to be as close as possible to the voltage reference of the grid voltage in phase angle and magnitude before the supplemental power supply is connected to the grid. The contactor is open at this time.

When the contactor is closing, zero signals are fed to PI1 and PI2 by SW1 switching to zero, and the voltage regulation function of PI1 and PI2 is discontinued. The previously calculated outputs, $\Delta U_{dv}$ and $\Delta U_{qv}$, of the voltage regulators PI1 and PI2 remain and eliminate the transient "jump" from voltage control to current control thereby maintaining a smooth transition.

For current control, current sensors CS1 and CS2 detect 130 the output phase current $i_a$ and $i_b$ of the supplemental power supply. The sensed currents are converted 132 to currents on the α-β plane according to the following algorithms:

$$i_\alpha=i_a \quad (11)$$

$$i_\beta=(2/\sqrt{3})*(0.5i_a+i_b) \quad (12)$$

The currents $i_\alpha$ and $i_\beta$ are converted 134 to $i_d$ and $i_q$ on the d-q plane according to the following algorithms:

$$i_d = i_\alpha \cos \gamma_{u\_g} - i_{62} \sin \gamma_{u\_g} \quad (13)$$

$$i_q = i_\alpha \sin \gamma_{u\_g} + i_\beta \cos \gamma_{u\_g} \quad (14)$$

The currents on the d-q axis are provided 136 as feedback to current regulators PI3 and PI4. Current references $i_{d\_ref}$ and $i_{q\_ref}$ are set 138 to zero during the voltage synchronization. Setting the reference currents to zero allows the controller to eliminate any over current caused by the voltage or circuit error. The two current references for the current regulators are set to zero before, and while, the supplemental power supply is connected to the grid so that the current regulators keep the current as close to zero as possible.

After the connection to the power grid is established, the current references, $i_{d\_ref}$ and $i_{q\_ref}$, are increased according to a predetermined ramp rate, (i.e., linearly over time), and the supplemental power supply will deliver current and power to the power grid 140.

The output voltages, $\Delta U_{di}$ and $\Delta U_{qi}$, of the regulators PI3 and PI4 are added 125 to the output voltages, $\Delta U_{dv}$ and $\Delta U_{qv}$, of the voltage regulators PI1 and PI2 to regulate the output voltages of the supplemental power supply.

Before the contactor is closed, the current reference is zero and the current feedback is zero. The output voltages, $\Delta U_{di}$ and $\Delta U_{qi}$ are zero. There is no activity in the current regulators PI3 and PI4. After the contactor is closed, the voltage regulators PI1 and PI2 maintain the previous output voltage and the regulation function is discontinued. The current regulators PI3 and PI4 are automatically activated to eliminate any possible transient current. If any transient current occurs, the feedback current, $i_d$ and $i_q$ will occur at the input of the regulators PI3 and PI4. The reference currents, $i_{d\_ref}$ and $i_{q\_ref}$ are zero, the regulators PI3 and PI4 will bring the feedback current to zero.

The rotating angle, $\gamma_{u\_g}$ is used in the voltage transformation 140 from the d-q plane to the abc plane to control the inverter output voltages in phase angle, phase sequence, and frequency to follow the grid voltages. The algorithms employ the rotating angle as follows:

$$U_{a\_ref} = U_{d\_com} \cos \gamma_{u\_g} - U_{q\_com} \sin \gamma_{u\_g} \quad (15)$$

$$U_{b\_ref} = U_{d\_com} \cos(\gamma_{u\_g} - 2/3\pi) + U_{q\_com} \sin(\gamma_{u\_g} - 2/3\pi) \quad (16)$$

$$U_{c\_ref} = U_{d\_com} \cos(\gamma_{u\_g} + 2/3\pi) + U_{q\_com} \sin(\gamma_{u\_g} + 2/3\pi) \quad (17)$$

The voltages, $U_{a\_ref}$, $U_{b\_ref}$, and $U_{c\_ref}$, are fed to a pulse width modulator 141 from which signals are sued to control the switching devices of the inverter.

Figure 5:
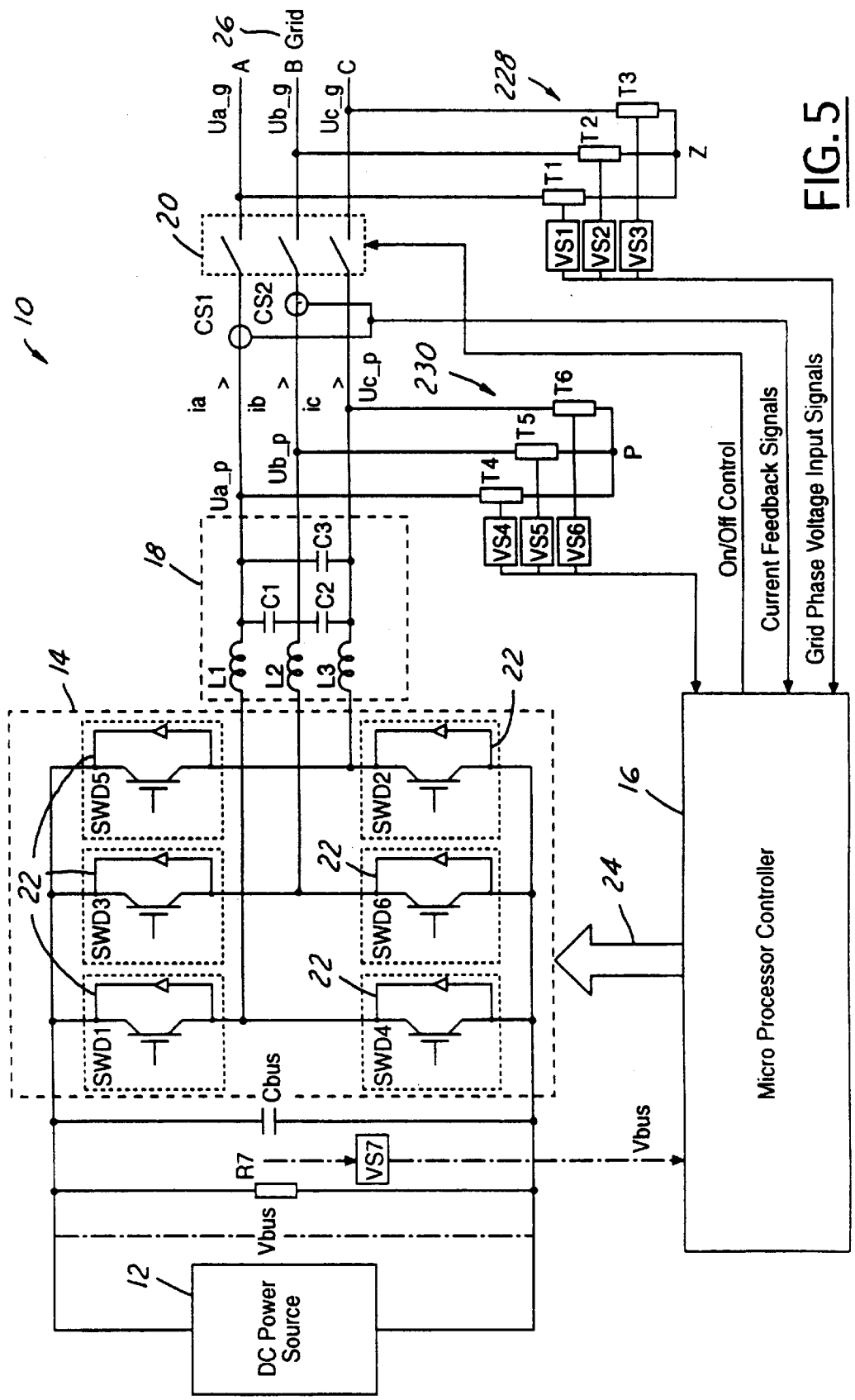
FIG. 5 is a circuit diagram of an electronic supplemental power supply as it is connected to a power grid according to another embodiment of the present invention.

In summary, the present invention detects the three phase voltages of the grid, $U_{a\_g}$, $U_{b\_g}$, and $U_{c\_g}$ and the output voltages of the supplemental power source, $U_{a\_p}$, $U_{b\_p}$, and $U_{c\_p}$, by using two y-connected resistor networks 28 and 30 as shown in FIG. 1, or a y-connected transformer 228 and 230 as shown in FIG. 5. The grid voltages are converted 104 to a rotating grid voltage vector with two components, $U_{\alpha\_g}$, and $U_{\beta\_g}$ on a two-axis plane, $\alpha$-$\beta$ plane. The vector's rotating phase angle, $\gamma_{u\_g}$ on the $\alpha$-$\beta$ plane is calculated from the two components $U_{\alpha\_g}$ and $U_{\beta\_g}$. The angle frequency $\omega_{u\_g}$, the phase sequence and the magnitude of the grid voltage vector are all calculated. The DC system control property for the three phase AC system is obtained by converting 112 the rotating grid voltage vector on the $\alpha$-$\beta$ plane to a vector with two components $U_{d\_g}$ and $U_{q\_g}$ on a two axis d-q plane. The rotating speed is equal to the speed, $\omega_{u\_g}$ of the grid voltage vector. The inverter 14 delivers its three phase output voltages by using the d-q axis grid voltages as voltage reference in the controller 16 to control the gating pulses to the inverter 14. Because the voltage references $U_{d\_g}$ and $U_{q\_g}$ are detected as three phase grid voltages, the output three phase voltages $U_{a\_p}$, $U_{b\_p}$, and $U_{c\_p}$, from the inverter 14 are controlled to follow the grid three phase voltages in phase angle and magnitude.

The voltage and current feedback controllers, PI1, PI2, PI3 and PI4 eliminate voltage errors in the inverter 14, on the d-q plane. The voltage controllers, PI1 and PI2, correct the actual three-phase output voltages $U_{a\_p}$, $U_{b\_p}$, and $U_{c\_p}$ from the supplemental power supply 10, keeping them as close as possible to the voltage references $U_{d\_g}$ and $U_{q\_g}$ of the grid voltage, in phase and magnitude before the contactor is closed.

The current regulators, PI3 and PI4 eliminate overcurrent during the short period of time the contactor is closed. When transient current occurs, the feedback currents appear at the input of PI3 and PI4. The reference currents are zero, so the regulators PI3 and PI4 will bring the current to zero. After the SPS "connection" is completed, the reference currens $I_{d\_ref}$ and $I_{q\_ref}$ are ramped up at a predetermined rate.

According to the system and method of the present invention, all of the voltage and current transformations and controls on difference planes are reference to the rotating grid voltage vector.

The invention covers all alternatives, modifications, and equivalents, as may be included within the spirit and scope of the appended claims.

What is claimed is:

1. A method for connecting a supplemental power supply having three-phase output voltages to a power grid having three-phase grid voltages, the supplemental power supply having a DC power source, an electronic inverter, a controller, a three-phase AC line filter and a three-phase circuit contactor, said method comprising the steps of:

detecting the three-phase grid voltages;

converting the three-phase grid voltages into voltages on a d-q plane;

detecting the three-phase output voltages of the supplemental power supply;

converting the detected output voltages into voltages on a d-q plane;

determining a voltage command to control the three-phase output voltages as close as possible to the three-phase grid voltages.

2. The method as claimed in claim 1 further comprising the step of controlling the output voltages of the supplemental power supply in magnitude and phase angle for synchronization of the supplemental power supply and the power grid.

3. The method as claimed in claim 1 wherein said step of converting said grid voltages into voltages on a d-q plane further comprises the steps of:

converting the detected grid voltages to a rotating vector on an $\alpha$-$\beta$ plane; and deriving a rotating angle from said grid voltage vector.

4. The method as claimed in claim 3 wherein said step of converting the three-phase output voltages into voltages on a d-q plane further comprises the steps of converting the detected output voltages into a rotating vector.

5. The method as claimed in claim 1 wherein said step of detecting the grid voltages further comprises detecting the grid voltages with a y-connected resistor network and the step of detecting the output voltages further comprise detecting the output voltages with a y-connected resistor network.

6. The method as claimed in claim 1 wherein said step of detecting the grid voltages further comprises detecting the grid voltages with a y-connected transformer and the step of detecting the output voltages further comprise detecting the output voltages with a y-connected transformer.

7. The method as claimed in claim 1 further comprising the step of calculating the change in a rotating angle over time to determine a rotating angle frequency.

8. The method as claimed in claim 7 further comprising the step of determining a phase sequence for the grid voltage from the sign of said rotating angle frequency.

9. A method for connecting a supplemental power supply having three-phase output voltages, $U_{a\_p}$, $U_{b\_p}$, and $U_{c\_p}$, to a power grid having three-phase grid voltages, $U_{a\_g}$, $U_{b\_g}$, and $U_{c\_g}$, the supplemental power supply having a DC power source, an electronic inverter, a controller, a three-phase AC line filter and a three-phase circuit contactor, said method comprising the steps of:

detecting the three-phase grid voltages, $U_{a\_g}$, $U_{b\_g}$, and $U_{c\_g}$;

converting the detected grid voltages to a rotating vector, $U_{\alpha\_g}$, $U_{\beta\_g}$, on an α-β. plane;

deriving a rotating angle, $\gamma_{u\_g}$, from said grid voltage vector;

converting said grid voltage vector into three-phase voltages on a d-q plane according to:

$U_{d\_g} = U_{\alpha\_g} * \cos \gamma_{u\_g} - U_{\beta\_g} * \sin \gamma_{u\_g}$, and $U_{q\_g} = U_{\alpha\_g} * \sin \gamma_{u\_g} + U_{\beta\_g} * \cos \gamma_{u\_g}$;

detecting the three-phase output voltages of the supplemental power supply;

converting the detected output voltages to an output rotating vector, $U_{\alpha\_p}$, $U_{\beta\_p}$;

converting said output rotating vector in three-phase voltages on a d-q plane according to:

$U_{d\_p} = U_{\alpha\_p} * \cos \gamma_{u\_g} - U_{\beta\_p} * \sin \gamma_{u\_g}$, and $U_{q\_p} = U_{\alpha\_p} * \sin \gamma_{u\_g} + U_{\beta\_p} * \cos \gamma_{u\_g}$;

determining a voltage command, $U_{d\_com}$, $U_{q\_com}$, to control the three-phase output voltages as close as possible to said three-phase grid voltages; and controlling the output voltages of the supplemental power supply in magnitude and phase angle for synchronization of the supplemental power supply and the power grid.

10. The method as claimed in claim 9 wherein said step of detecting the grid voltages further comprises detecting the grid voltages with a y-connected resistor network and the step of detecting the output voltages further comprise detecting the output voltages with a y-connected resistor network.

11. The method as claimed in claim 9 wherein said step of detecting the grid voltages further comprises detecting the grid voltages with a y-connected transformer and the step of detecting the output voltages further comprise detecting the output voltages with a y-connected transformer.

12. The method as claimed in claim 9 further comprising the step of calculating the change in said rotating angle $\gamma_{u\_g}$, over time to determine a rotating angle frequency $\omega_{u\_g}$.

13. The method as claimed in claim 12 further comprising the step of determining a phase sequence for the grid voltage from the sign of said rotating angle frequency.

14. The method as claimed in claim 9 wherein the supplemental power supply has a first and a second voltage regulator, said step of determining a voltage command further comprises the steps of:

supplying said grid voltages on the d-q plane as references to the first and second voltage regulators;

supplying said output voltages of the supplemental power supply on the d-q plane as feedback to the first and second voltage regulators;

determining an error signal, $U_{d\_err}$, as the difference between the reference voltage $U_{d\_g}$ and the feedback voltage $U_{d\_p}$;

determining an error signal, $U_{q\_err}$, as the difference between the reference voltage $U_{q\_g}$ and the feedback voltage $U_{q\_p}$;

summing $U_{d\_g}$ and $U_{d\_err}$ to determine said command voltage $U_{d\_com}$; and summing $U_{q\_g}$ and $U_{q\_err}$ to determine said command voltage $U_{q\_com}$.

15. The method as claimed in claim 14 wherein said step of controlling the output voltages further comprises the step of calculating reference voltages as:

$U_{a\_ref} = U_{d\_com} \cos \gamma_{u\_g} - U_{q\_com} \sin \gamma_{u\_g}$ $U_{b\_ref} = U_{d\_com} \cos(\gamma_{u\-g} - 2\pi/3) + U_{q\_com} \sin(\gamma_{u\-g} - 2\pi/3)$ $U_{b\_ref} = U_{d\_com} \cos(\gamma_{u\-g} + 2\pi/3) + U_{q\_com} \sin(\gamma_{u\-g} + 2\pi/3)$ for controlling the output voltages in phase angle, phase sequence, and frequency to follow grid voltages.

16. The method as claimed in claim 14 wherein said step of controlling the output voltages further comprises:

determining when $U_{d\_err}$ and $U_{q\_err}$ reach a predetermined tolerance, thereby indicating when synchronization has been realized.

17. The method as claimed in claim 9 wherein the supplemental power supply has a first and second current regulator and current references $i_{d\_ref}$ and $i_{q\_ref}$, said method further comprising the steps of:

sensing an output phase current $i_a$ and $i_b$ for the supplemental power supply;

converting said sensed currents into currents on the α-β plane;

converting said currents on said α-β plane into currents on the d-q axis;

setting the current references to zero during connection of the supplemental power supply to the power grid; and increasing the current references after the supplemental power supply is connected to the power grid, the current references are increased according to a predetermined ramp rate.

* * * * *